(12) United States Patent
Pinto

(10) Patent No.: US 7,107,241 B1
(45) Date of Patent: Sep. 12, 2006

(54) SYSTEM AND METHOD FOR PROCESSING A SECURED COLLATERAL LOAN

(75) Inventor: Edward J. Pinto, Bethesda, MD (US)

(73) Assignee: Lenders Residential Asset Company LLC, Bethesda, MD (US)

(*) Notice: Subject to any disclaimer, the term of this patent is extended or adjusted under 35 U.S.C. 154(b) by 0 days.

(21) Appl. No.: 09/522,481

(22) Filed: Mar. 10, 2000

(51) Int. Cl.
*G06F 17/60* (2006.01)

(52) U.S. Cl. ........................................ 705/38

(58) Field of Classification Search ........... 705/42, 705/44, 35–40
See application file for complete search history.

(56) References Cited

U.S. PATENT DOCUMENTS

| | | | | |
|---|---|---|---|---|
| 5,611,052 | A | 3/1997 | Dykstra et al. | 395/238 |
| 5,797,133 | A | 8/1998 | Jones et al. | 705/38 |
| 5,870,721 | A * | 2/1999 | Norris | 705/38 |
| 5,930,776 | A * | 7/1999 | Dykstra et al. | 705/38 |
| 5,940,812 | A * | 8/1999 | Tengel et al. | 705/38 |
| 6,016,482 | A | 1/2000 | Molinari et al. | 705/38 |
| 6,029,149 | A | 2/2000 | Dykstra et al. | 705/38 |
| 6,088,686 | A * | 7/2000 | Walker et al. | 705/38 |
| 6,105,007 | A * | 8/2000 | Norris | 705/35 |
| 6,233,566 | B1 * | 5/2001 | Levine et al. | 705/36 |

FOREIGN PATENT DOCUMENTS

EP 895173 A2 * 2/1999
WO 01/41019 * 6/2001

OTHER PUBLICATIONS

"FIco Scores", http://www.ineedcredit.com/mortgages/fico.htm.*
"FIco Scores", http://www.mortgage101.com/partner-scripts/1213.asp?p=cdunn.*
"Uniform Residential Loan Application", Freddie Mac Form 65, Form 1003, Form RD 410-4, OMB No. 0575-0172.*
"Mortgage Express Uniiform Residential Loan Application".*
"Lenders migrate to Net", "Original News", New York: Sep. 1998. vol. 7, Iss 13; p. 109, Proquest.*
"E-loan", http://web.archive.org/web/*/http://www.eloan.com/, Jan. 25, 1999, "WaybackMachine".*
Diehl, Cheryl L. & Bray, Susan R. Handbook of Mortgage Processing. Mortgage Bankers Association of America. Washington, DC. 1993. pp. 51-69, 128-133 and 177-179.*

* cited by examiner

*Primary Examiner*—Frantzy Poinvil
*Assistant Examiner*—Jason Borlinghaus
(74) *Attorney, Agent, or Firm*—Stuart T. Langley; Kent A. Lembke; Hogan & Hartson

(57) ABSTRACT

A method of processing a secured loan so as to close the loan in time periods on the order of one hour. The loan process is initiated by accepting a loan application from a borrower. The loan application includes at least the borrower's identity, collateral identity, and stated income of the borrower. A credit request is generated based upon the borrower's identity to obtain a credit report, the credit report including credit information and credit score information. A property evaluation database is accessed using the collateral identity. A matrix having specified approval criteria is applied to generate a credit approval, collateral title underwriting approval, and income approval. Loan documentation is generated and transmitted for signatures at closing.

17 Claims, 5 Drawing Sheets

| FICO | ABILITY TO REPAY APPROVAL | WILLINGNESS TO REPAY APPROVAL | COLLATERAL APPROVAL | | | | |
|---|---|---|---|---|---|---|---|
| | | | TITLE | | | VALUATION | |
| | | | 1 MTG | >1 MTG | SECOND LIEN | | |
| LOW | REQUIRE VERIFICATION | CONDITIONAL ON RESULTS | PROPERTY SEARCH | PROPERTY SEARCH | PROPERTY SEARCH | TRADITIONAL APPRAISAL | |
| MEDIUM | CONDITIONAL VERIFICATION | VERIFY STATED REASONS | ACCEPT STATED | PROPERTY SEARCH | PROPERTY SEARCH | APPRAISER REVIEW | |
| HIGH | ACCEPT STATED | ACCEPT STATED EXPLANATION | ACCEPT STATED | PROPERTY SEARCH | ACCEPT STATUS STATED BY APPLICANT | ACCEPT DB VALUATION WHEN CONFID. IS HIGH | |
| VERY HIGH | ACCEPT STATED | ACCEPT STATED EXPLANATION | ACCEPT STATED | ACCEPT STATED | ACCEPT STATUS STATED BY APPLICANT | ACCEPT DATABASE VALUATION | |

SYSTEM AND METHOD FOR PROCESSING A SECURED COLLATERAL LOAN

BACKGROUND OF THE INVENTION

1. Field of the Invention

The present invention relates, in general, to financial transactions, and, more particularly, to systems, mechanisms and methods for processing loans that are secured by an asset such as real property.

2. Relevant Background

Money lending is an essential function in commerce and personal finance. Individuals and businesses borrow money to obtain the goods and services they need when they need them. There is continued emphasis in the financial services industry to lower the burdens and barriers associated with making a loan, especially to high quality borrowers. This is particularly true in the competitive home equity loan market where borrowers favor lenders with quick, low burden loan approval processes.

In general, loan processing comprises a series of steps involving gathering information specific to a given transaction, documenting the gathered information, and forming a loan which can be marketed easily to consolidators. In a residential market high-quality loans that are readily consolidated are referred to as "A paper" or "Fannie-Freddie conforming paper". About 70–80 percent of the mortgage market involves these high-quality loans. Home equity loans often use a similar grading system such as "A", "B", "C", "D", and the like.

One of the goals of the lending process for both the lender and the borrower is closing a loan quickly. However, in order to produce high-grade loans, the loan process involves multiple steps to obtain and synthesize information from diverse sources. Also, a variety of individuals from a range of organizations may contributed to the process. As a result, a typical loan process takes several weeks.

Particularly in the case of high-quality loans where the borrower has high credit rating and good statistical ratios and history of paying back loans, there is a great need to streamline the loan origination process. From the lender's perspective, these borrowers are low risk, valuable customers. From the borrower's perspective, there is a perception that a faster loan process is less prone to errors. Both borrowers and lenders view a fast loan process as less expensive to complete. For these reasons both borrowers and lenders are attracted to a loan process that leads to rapid closing while producing quality loans.

Although speeding up the loan process is a significant goal, the process must still generate high-quality results. That is to say, the ultimate loan that is generated must evidence a high assurance that the loan is made to a borrower that will repay the loan. In other words, the process that streamlines the loan origination cannot unacceptably affect the business risk taken by the lender.

Many steps taken in conventional loan processing are perceived to lessen the business risk to the lender. However, it has been found that this perception is often misleading and that these steps do not reduce the business risk of the loan. These ineffective process steps increased cost and delay without a proportionate increase in the value and quality of the loan product produced.

U.S. Pat. No. 5,870,721 involves a system for processing non-secured loans. Hence, this patent does not address the substantial problems associated with collateralized loans. Also, non-secured loans are typically for lower amounts and so the total risk taken by the lender is generally less. In contrast, secured loans require significant documentation to produce high quality marketable loans.

U.S. Pat. No. 5,797,133 also deals with unsecured loans and primarily deals with issues related to obtaining credit approval from a third party source. However, the patent does not describe how the processes of obtaining loan approval are performed or automated by the third party. Also, U.S. Pat. No. 5,797,133 deals with an automated-system that replaces humans in the loan making process in contrast with a computer-aided system that aids a human user in making better, faster loan decisions.

Information that is available to analyze a loan application is of several distinct types. As used herein, the term "direct information" refers to information that is obtained by first-person observation, usually in response to a specific request for the data. Direct information is often expensive and time consuming to obtain and use. Examples include property appraisal reports generated by in-person inspection of the property. Another example is a credit report that, unlike most direct information, can be dynamically generated upon receipt of a specific borrower's identity.

In contrast "indirect information" refers to data that is gathered in mass by information services usually before there is any request for the data. Indirect information includes information that is extracted from data sources as compared to the direct data itself. Examples include property sales databases that store historical and current property sales data for whole communities on an ongoing basis. Indirect information is typically more available than direct information because it is gathered before a specific request is generated.

Another type of information is "derivative information" that is derived and/or inferred from direct and indirect information. Derivative information involves some processing and decision making about the data but is generally as available as the direct or indirect information sources themselves. Examples of derivative information include information derived by applying trending algorithms or other statistical algorithms to historical property sales data.

The mortgage loan industry is currently constrained by a perceived need to obtain direct information supporting a loan application and to verify information provided by borrowers and indirect information sources. As noted above, information sources vary significantly in their availability and the time it takes to access. Reliance on direct information tends to stall the loan process. As in any multi-stage process, stalling at one stage creates significant management difficulties in that work in process (WIP) must be queued, missing information matched with the queued WIP, and WIP continuously scheduled and re-scheduled for completion. These difficulties create "pipeline" fallout that increase processing costs and delay actual loan approval.

Even with the expanding amount of information available through online information sources, public databases and private databases, direct information is time consuming to obtain. Also, verification of indirect information sources, which are more readily available, is time consuming and often requires reference to direct data sources. Most often, derived data is not currently used in loan processing where the lender has a substantial interest in ensuring that the loan will be repaid. A need exists for a method and system for loan processing that makes efficient and effective use of widely available indirect information sources and information that can be derived from such sources.

Loan processing involves several general steps including application, approval, closing and funding. At each stage, a certain amount of attrition occurs in the form of loans for which processing is started, but not completed. Attrition increases costs for lenders because of work that is started but will never generate revenue. These costs are typically passed on to the borrowers that do close loans in the form of increased interest rates and costs. Moreover, loan applications that are not completed may clog the processing pipeline increasing delays and costs generally.

Of these events, closing is typically the most important to the borrower and lender as closing is the point at which a contract exists between the parties to make or complete the loan. Many lenders advertise rapid "loan approval", but approval is quite distinct from a closing. Often the steps required to move from approval to closing are the most difficult and costly steps in the loan process. Accordingly, many approved loans still suffer attrition and fail to fund. In contrast, very low attrition occurs after closing, usually significantly less than one percent. Funding refers to the final process where funds are actually transferred from the lender to the borrower at which point both parties benefit from the loan process.

SUMMARY OF THE INVENTION

Briefly stated, the present invention involves a method of processing a secured loan initiated by accepting a loan application from a borrower. The loan application includes at least the borrower's identity, collateral identity, and stated income of the borrower. A credit request is generated based upon the borrower's identity to obtain a credit report, the credit report including credit information and credit score information. A property evaluation database is accessed using the collateral identity. Based upon the credit report, a credit approval, collateral title underwriting approval, and income approval are generated. Loan documentation is generated and transmitted for signatures at closing.

DETAILED DESCRIPTION OF THE PREFERRED EMBODIMENTS

The present invention involves a system and method for loan processing known as FASLOAN® that streamlines loan processing, particularly for secured loans such as home equity, refinance and purchase money loans, to reduce the time required to make a loan from weeks to as little as one hour. FASLOAN® is a service mark or registered service mark of Lenders Residential Asset Company LLC in the United Sates and other countries. Studies show that prior home equity loan processing systems average about seventeen days from application to closing, with refinance and purchase money loans taking significantly longer. A one hour closing in accordance with the present invention offers a dramatic reduction in that closings occur in less than 0.5% of the average time required by conventional loan processes. Anyone who has participated in a loan process appreciates that this striking improvement benefits both lenders and borrowers and provides new ways of doing business in secured financing markets.

Much of this time is lost in inefficient processing steps and lack of control over the loan process resulting in pipeline losses. In general the steps to making a secured loan involve: getting information from a client or prospective borrower; verifying the information; evaluating the information; preparing documents for signature; transmitting documents; signing the documents; and funding the loan. Due to governmental and regulatory limitations, funding may actually occur several days after the other steps. These steps of processing information involve obtaining and analyzing credit reports as well as obtaining and analyzing FICO scores, valuation, and debt-to-income ratios. The present invention improves upon these processes not merely to automate the processes but to make their performance uniformly streamlined.

One goal of the present invention is to reduce the time required to process a loan from application to closing to a matter of hours, preferably in less than one hour. As a benefit, loan processing costs are decreased and the rate at which applications are converted to funded loans improves dramatically. It is believed that the process in accordance with the present invention can in some instances double the rate at which applications are converted to funded loans. Hence, the lenders advertising and processing resources are expended efficiently on loans that will produce revenue rather than on applications that fail to be funded.

The present invention is illustrated and described in terms of a distributed computing environment such as an enterprise computing system using both public communication channels such as the Internet as well as private communications networks such as local area networks (LANs) and wide area networks (WANs). However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

Figure 1:
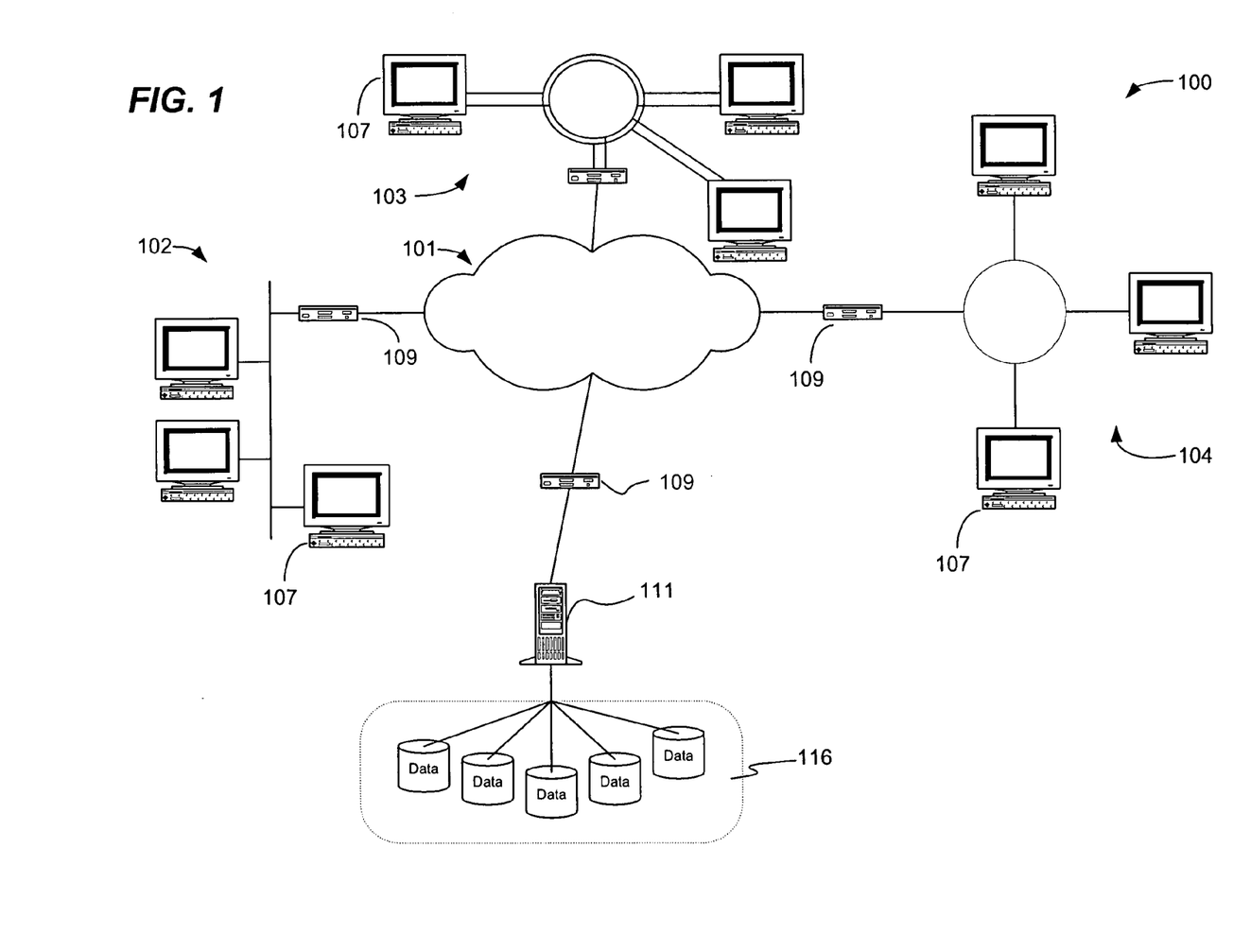
FIG. 1 shows a computing environment in which the present invention may be implemented.

FIG. 1 shows an exemplary computing environment 100 in which the present invention may be implemented. Environment 100 includes a plurality of local networks such as Ethernet network 102, FDDI network 103 and Token ring network 104. Essentially, a number of computing devices and groups of devices are interconnected through a network 101. Network devices 107 comprise workstations, personal computers, network appliances, personal data appliances (PDAs), switches, routers, hubs as well as any available device that couples to and communicates with a network 101. Local networks 102, 103 and 104 are each coupled to network 101 through routers 109.

LANs 102, 103 and 104 may be implemented using any available topology and may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the Internet or another network mechanism such as a fibre channel fabric, conventional WAN technologies. It is contemplated that network 101 may be implemented using copper wire technologies, wireless technologies, and hybrids of copper and wireless to implement any physical connection.

Local networks 102, 103 and 104 include one or more workstations such as computers 107. One or more computers 107 may be configured as an application and/or file server. Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 provide a physical connection between the various devices through network 101. Routers 109 may implement desired access and security protocols to manage access through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 116 that provides mass storage capacity beyond what an individual device can efficiently use and manage. Selected components of the present invention may be stored in or implemented in shared mass storage.

Figure 2:
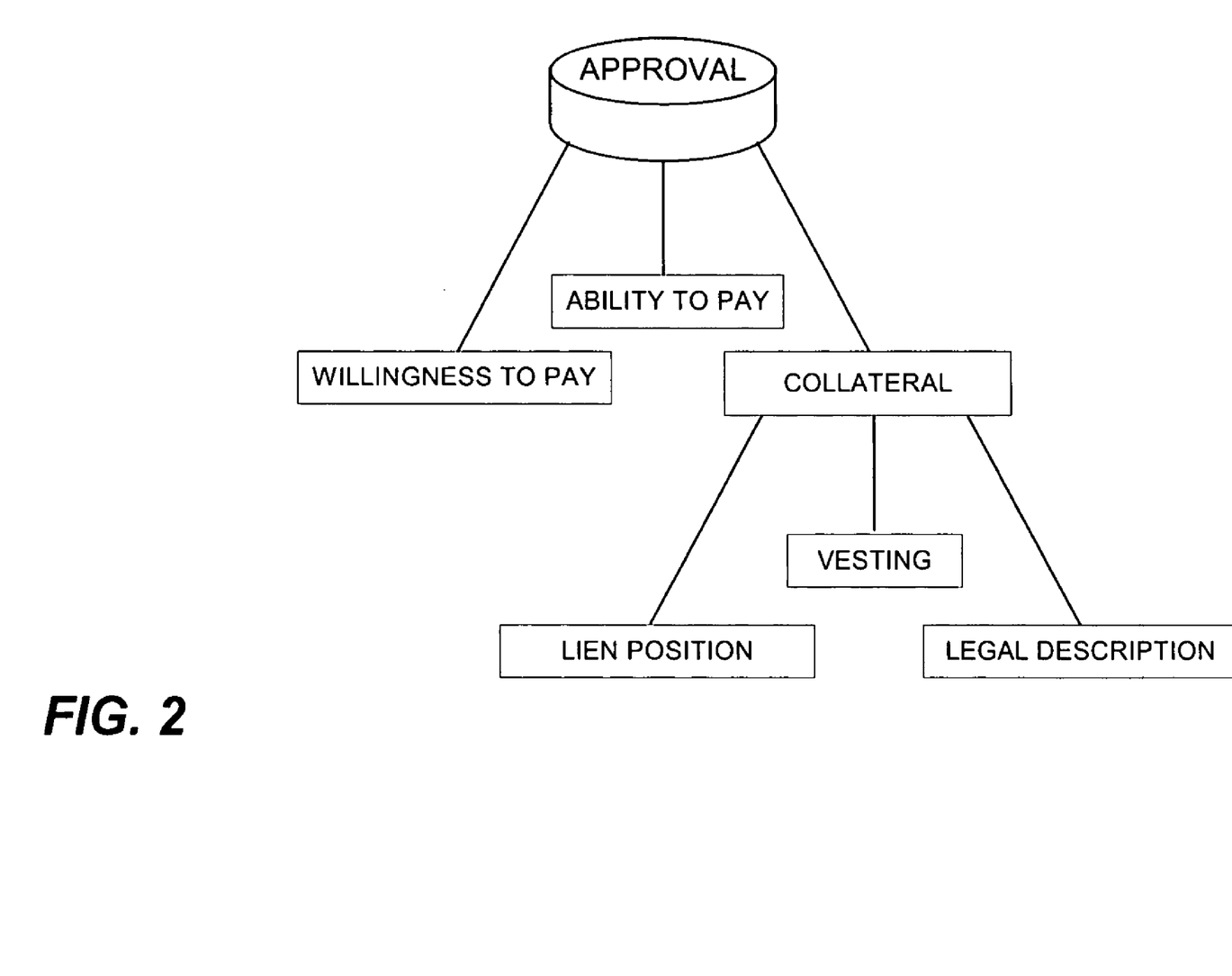
FIG. 2 illustrates a schematic overview of the loan underwriting process in accordance with the present invention.

As shown in FIG. 2, the loan underwriting process includes a number of procedures directed at approving a loan for funding. The term "approval" is used loosely in the industry and often means only an approval that is conditional on completion of the processes outlined in FIG. 2. Such a conditional approval is based upon representations of the borrower and assumptions on the part of the lender. Hence, a conditional approval can be given quickly, but does not in reality indicate assurance that a loan will close or fund. To close and fund, the various processes shown in FIG. 2 must be completed to support underwriting of the loan. The present invention is directed towards systems and methods for completing the tasks outlined in FIG. 2 in a quick, effective and reliable fashion. As a result, the present invention provides a secured loan product that can be closed in about the same amount of time that prior processes require to reach the conditional approval stage.

Three basic considerations of loan underwriting are to determine the borrower's ability to repay a loan, the borrower's willingness to repay the loan, and to evaluate any collateral used to secure the loan. Each of these considerations are evaluated using combinations of direct, indirect, and derivative information. In general, where direct information is available with low latency (e.g., less than one hour) it is preferred. In accordance with the present invention, indirect and derivative information is used where low latency access to direct information is not possible. In this manner the loan processing pipeline avoids stalls waiting for information.

Ability to pay is conventionally evaluated using a combination of the borrower's stated income, recent pay stubs, employment verification by calling or visiting the borrower's employer, and/or review of recent income tax returns. Most of these information sources, with the notable exception of stated income, take time to access and are inconvenient for the borrower and/or lender to comply with. Stated income, while relevant, is often viewed as lacking sufficient reliability to support underwriting. In accordance with the present invention, stated income is used in combination with information derived from credit history information (i.e., derivative information) to generate underwriting approval with a high degree of reliability. This feature avoids processing delays and inconvenience associated with obtaining the direct information. This process is described in greater detail in reference to FIG. 3 and FIG. 4.

Willingness to repay a loan is distinct from ability to repay a loan and is often directly assessable from examination of a credit history. Credit history comprises, for example, a credit report and a Fair Isaac Company (FICO) score or equivalent. The FICO score is an automated rating process for evaluating credit reports, and so is itself derivative information. The FICO score is a dynamic value calculated at the time a credit file is accessed using current information. The higher the FICO score the better the credit rating. The score is used in conjunction with a user-defined cut off strategy. For example, a user might define that only borrowers with FICO scores greater than 650 indicate sufficient willingness to repay a loan to underwrite the loan.

Collateral evaluation itself comprises a plurality of processes used to validate that the loan collateral is suitable for underwriting the loan. In a residential home mortgage, for example, the loan collateral must be evaluated or appraised to estimate the current value of the collateral. Options for performing the valuation step include a database valuation which queries an on-line resource to determine a valuation and a confidence score. In accordance with the present invention, the valuation and confidence score are used as indexes into a matrix that specifies rules for generating a valuation approval. This matrix, for example matrix 501 shown in FIG. 5, specifies when a valuation approval can be generated and takes into consideration other information such as the borrower's FICO score, purpose of the loan, and other criteria agreed upon between the loan processor and the lender. In most cases the database valuation by itself supports generating an approval of the valuation. In cases where, for example, the confidence is low or the determined valuation differs substantially from a stated valuation an appraiser may be asked to review the database valuation before a valuation approval is generated. In still other cases a traditional appraisal using the familiar Fannie Mae (FNMA) form 2055 may be required.

Figure 5:
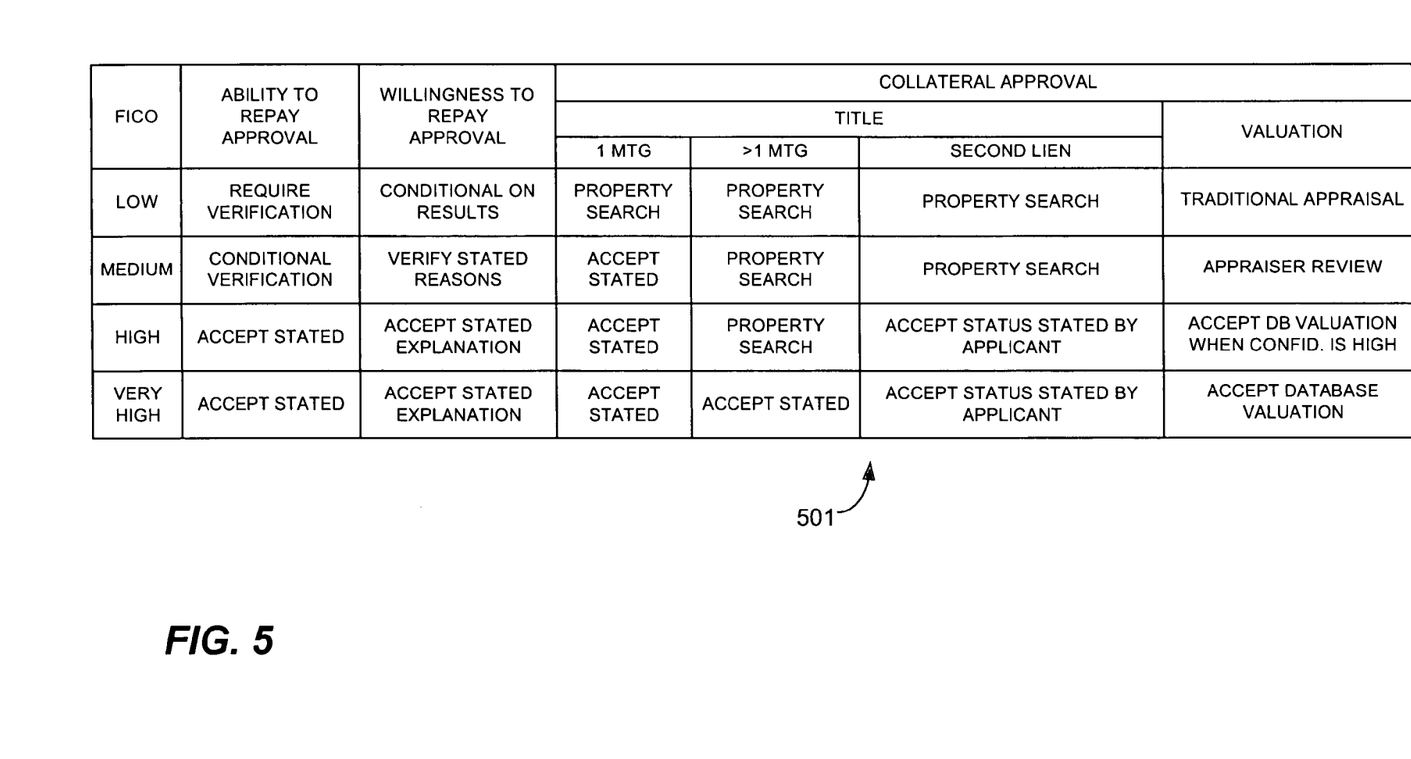
FIG. 5 shows an exemplary underwriting matrix in accordance with the present invention.

In addition to the valuation, the collateral is also supported by a lender's title insurance policy that protects the lender against defects in title that occurred in the past. A title policy is an instrument that shifts some of the lender's risk to a title company. The title company, in turn, requires the lender and/or borrower to provide information as to the lien position, vesting, and legal description of the property used as collateral to underwrite the policy. A title company will underwrite collateral that meets the title company specified criteria. It is contemplated that in some cases a lender may opt to self-insure this risk eliminating the need for, and associated cost of, a title insurance policy. This is implemented, for example, buy specifying criteria in matrix 501 that when met indicate self-insurance is appropriate. For example, a high FICO score coupled with a low to moderate loan amount may be implemented as self-insurance criteria. In yet another alternative, the lender can reinsure the risk of self-insurance by purchasing financial guarantee coverage which is not licensed title insurance, but backs the self-insurance of the lender with a third party guarantee.

In conventional processes the lien position, vesting, and legal description are evaluated using a title search to obtain direct information validating any user-supplied information. Although direct title information may be available, it is often time consuming to obtain. A full title search examines records documenting the chain of title, taxes levied against the property, as well as judgments and liens against current or prior owners.

In accordance with the present invention, the credit report including a FICO score or equivalent substitute, is used in combination with the borrower's representations as a substitute for a full title search. A suitably high FICO score indicates more than just ability and willingness to pay, it also indicates a general veracity of the borrower's statements. Hence, the borrower is asked to identify the property by address or legal description, if available, identify themselves by name, and to indicate any liens, judgments, or other encumbrances against the collateral property. The collateral underwriting and lender's title insurance policy are issued based on this representation in combination with the FICO score.

Alternatively, the FICO score can be used to determine whether a title search can be postponed until after closing. After closing the lender remains able to withhold funding if it is determined that the application involved material misrepresentations or fraud. While withholding funding is not entirely at the lender's discretion as it is before closing, these protections enable the lender to postpone certain activities, such as a title search, until after closing. After closing, it is contemplated that a limited "last record" or full title search may be used to validate that neither fraud nor misrepresentations are involved. A quick last record type search will have the owner's names to validate vesting, and a legal description of the property. Even where a title search is performed it is placed at a process stage where it does not impact closing and hence does not slow the loan process or significantly decrease the rate at which applications are converted into funded loans.

Figure 3:
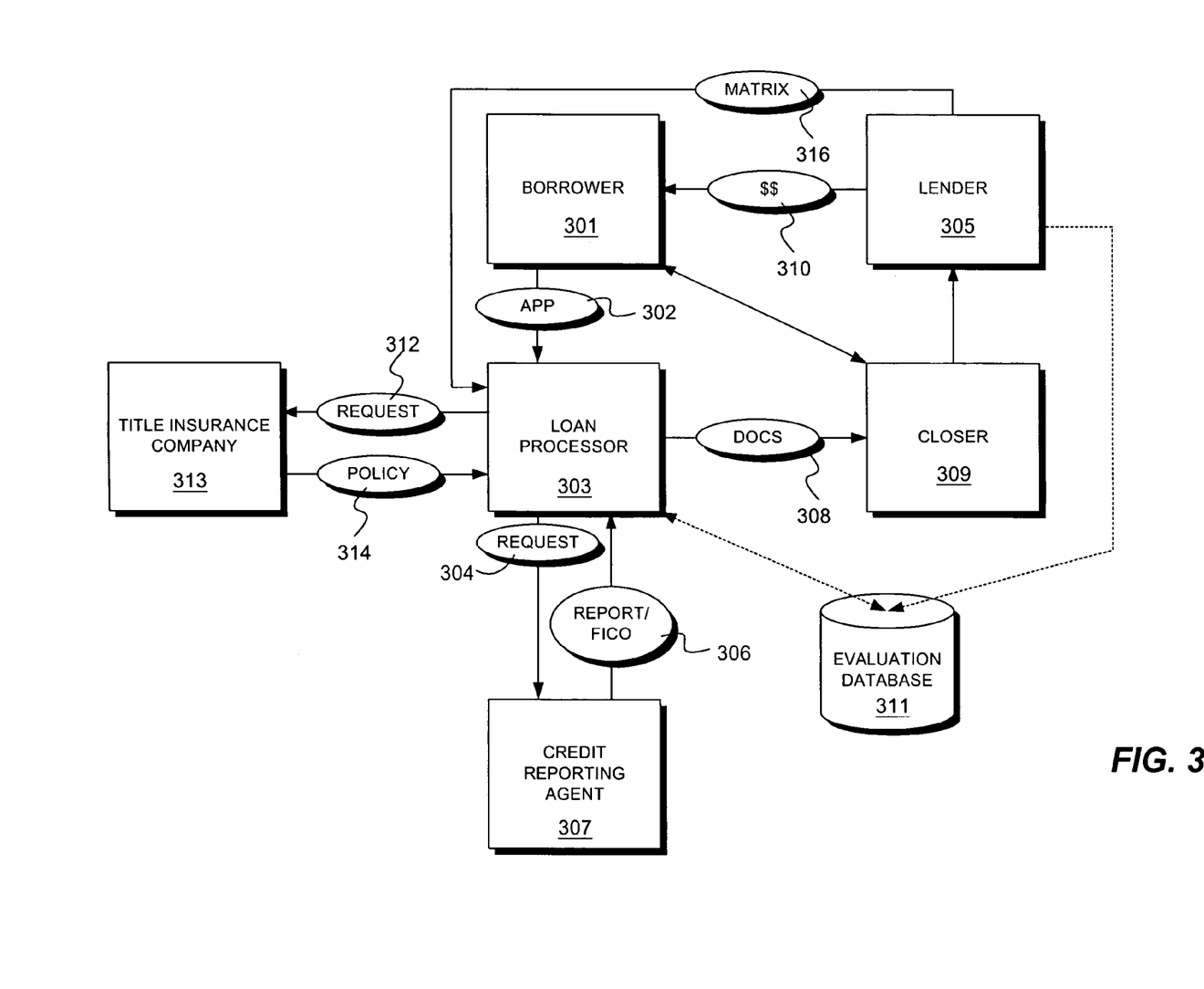
FIG. 3 shows a data flow diagram illustrating data processing in accordance with the present invention.
Figure 4:
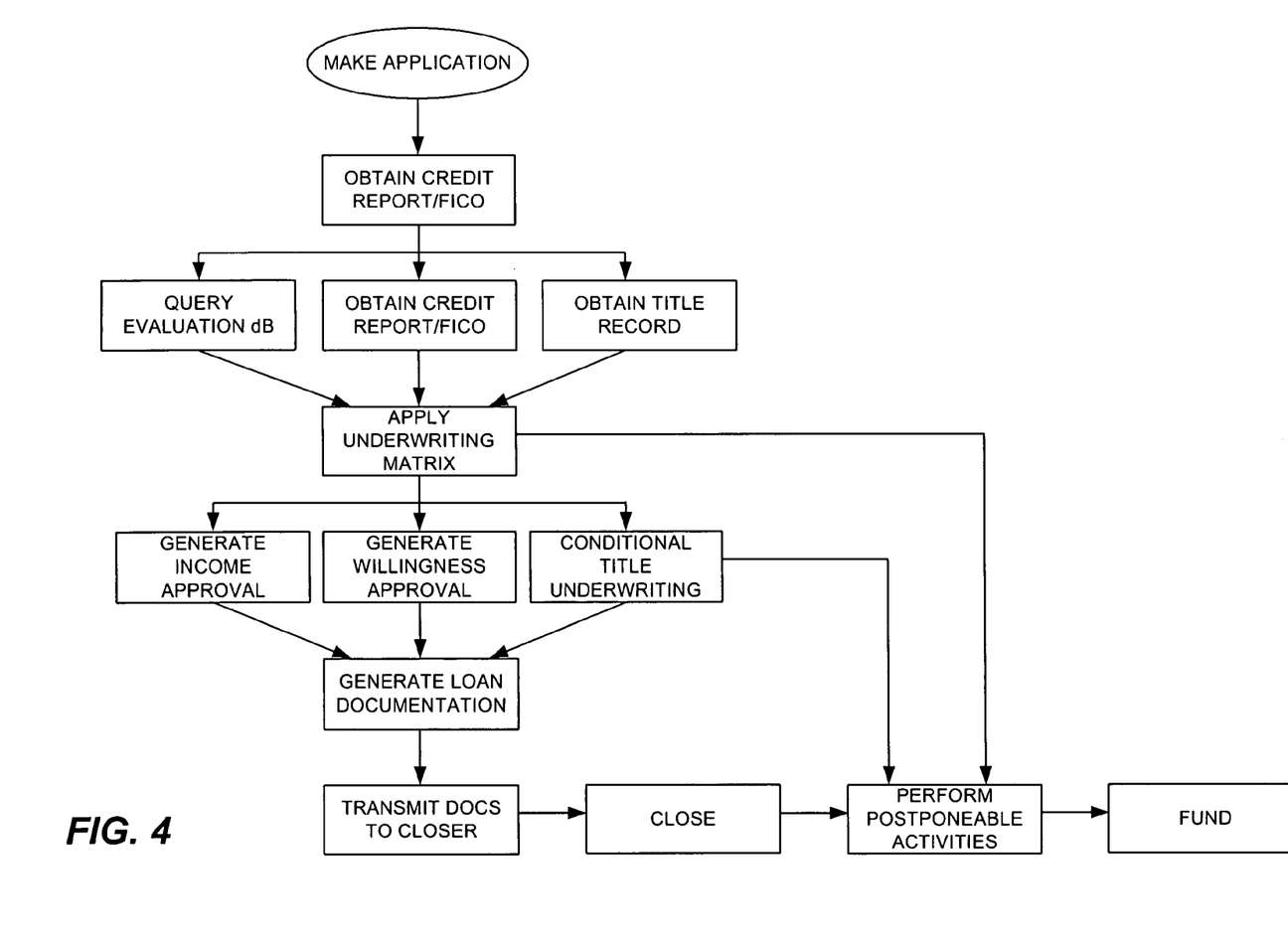
FIG. 4 is a process flow diagram illustrating steps in the loan process in accordance with the present invention.

The loan process in accordance with the present invention is usefully understood with reference to both FIG. 3 and FIG. 4 which will be described together. FIG. 3 shows data exchanges that occur in an exemplary process in accordance with the present invention whereas FIG. 4 shows a flow diagram of steps undertaken in the method of the present invention. A borrower 301 initiates a loan process by completing a loan application 302 either on paper, electronically, by telephone, or other means for communicating with the loan processor. A loan processor may be an agent or broker working for a lender 305, or may be an employee of the lender 305. The loan application 302 may be a proprietary loan application or standardized application such as a uniform residential loan application such as the FannieMae form 1003. Loan application 302 preferably indicates the borrower's identity, social security number, borrower's stated income, collateral identity, stated value of the collateral, and amount of the loan. Other information is typically included such as any representations by the borrower that are to be relied on in the loan process.

Loan processor 303 typically reviews application 302 verbally with borrower 301 and generates a request 304 to a credit reporting agency or bureau 307 using the information parsed from application 302. Request 304 is preferably made while loan processor 303 remains in personal or telephone contact with the borrower and may occur before the review of application 302 is complete. Credit agent 307 returns a credit report 306 including a FICO score or equivalent. Example credit agencies include, for example, Experian Information Solutions, Inc. (formerly TRW), Equifax, Inc., and Trans Union, Corporation.

Loan processor 303 uses the returned credit report 306 to evaluate further loan processing decisions. In the example of FIG. 3, lender 305 provides an underwriting matrix information 316 that correlates credit report information with acceptable loan processing actions that can be taken by the loan processor. Loan processor 303 may obtain other matrix information from other sources such as title insurance company 313, federal regulators and the like. For example, matrix 501 shown in FIG. 5 includes a combination of lenders underwriting conditions and title insurance underwriting conditions established based upon particular FICO score ranges. Depending on the FICO score returned in report 306, the underwriter may use the applicant's representations without further verification or documentation. Alternatively, certain FICO scores may require additional verification but allow that verification to be postponed until after closing. Lower FICO scores will require higher scrutiny and possible require conventional, slower loan processing to verify all information. In any case, by using matrix 501 in accordance with the present invention in the approval process the lender's and/or title insurance company's criteria for a quality product are satisfied.

It should be understood that matrix 501 illustrated in FIG. 5 is greatly simplified for purposes of illustration and to ease understanding. The factors considered may include multiple dimensions and so a practical matrix is not readily illustrated in a two-dimensional table such as shown in FIG. 5. A given loan processing mechanism in accordance with the present invention may actually be implemented as a plurality of separate matrices rather than a single multi-dimensional matrix. In essence, matrix 501 can be implemented in any available data structure that enables an association between multiple criteria and rules for generating approval of the ability to pay, willingness to pay, as well as collateral approval including valuation approval and title underwriting.

It is contemplated that each loan product and each lender will have a different matrix such as matrix 501 to meet the needs of a particular application. Typically the cutoff points and responses for a given matrix will be negotiated on a product-by-product basis with a lender 305 prior to the loan making process described in FIG. 3. For example, for loans at a 90% loan to value (LTV) the specification of high, medium, low, and very low with respect to FICO scores will be different than for 80% LTV products. Similarly, some loan products capped at relatively small loan amounts will have more restrictive FICO criteria than would loan products capped at higher amounts. Examples of criteria that are considered in generating a matrix include maximum loan amount, minimum loan amount, debt ratio, lien position (e.g., will this loan be a $1^{st}$, $2^{nd}$, $3^{rd}$ position or the like), property types (e.g., owner-occupied, single family, attached, detached, condominium, etc.), interest rate (i.e., quantity, fixed or variable rate) and loan purpose (e.g., refinance, cash-out, etc). It is contemplated that other criteria may be used to specify a separate matrix and within a matrix where the criteria are relevant to the perceived business risk of the loan product.

Each loan matrix will be reviewed periodically or from time-to-time to validate the criteria and cutoff points specified therein. In this manner, both lender and borrower are protected against using the matrix when dynamic market conditions affect validity of the assumptions upon which the matrix is built. However, the rapid application-to-close time provided by the present invention inherently solves many problems associated with rapid market fluctuation. Because the pipeline of loans in process is turning quickly, the risk associated with changing conditions is greatly reduced.

For example, an increase in interest rates makes each loan in the pipeline less valuable. Companies often purchase "pipeline coverage" to hedge against this risk. Pipeline coverage may take the form of securities or options (e.g., treasury options and/or puts/calls on mortgage backed securities) that offset market movements that affect the mortgage pipeline. This pipeline coverage is often expensive. Because the present invention lessens this risk dramatically, costs are expected to be reduced and in some cases eliminated. In the event of rapid market changes, a matrix can be changed quickly so that the pipeline quickly fills with loans formed to account for the changed conditions.

Returning again to the data flow diagram of FIG. 3, loan processor 303 parses information from the application 302 and when the conditions set out in matrix 501 are satisfied, generates a request 312 to title insurance company 313. The request 312 includes information specified by title insurance company 313 to underwrite the title policy. As indicated in FIG. 5, with a sufficiently high FICO score the underwriting can be performed based entirely on information stated by the applicant. In other FICO ranges stated information is conditionally acceptable depending on other results. Although matrix 501 is illustrated as a simple two-dimensional table for ease of description and understanding, it should be understood that a more complex matrix with multiple dimensions and conditional interactions between the elements is contemplated.

Title insurance company 313 generates a title policy, for example a lenders title policy 314 naming lender 305 as the beneficiary. Once received, loan processor 303 can generate documentation 308 to be sent to closer 309. Closer 309 may be an representative of loan processor 303, title company 313, lender 305 or another interested third party. Documentation 308 is preferably transmitted electronically by E-mail or facsimile. When available, a secure transmission method is preferred using technology such as S/MIME or OpenPGP to encrypt/decrypt documentation. Closer 309 interacts with borrower 301 to obtain necessary signatures to close the loan. In a particular example, closer 309 receives documentation in less than an hour from the transmittal of application 302.

Once closed, closer 309 informs lender 305 to fund the loan by transferring funds 310 to borrower 301. In many cases there are government imposed waiting periods between closing and funding such as a three day waiting period in home equity and second mortgage loans. This waiting period can be used by lender 305 to verify information provided by borrower 301 is free of misrepresentations or fraud. For example, an evaluation database 301 may be consulted to obtain a limited "last record" or full deed type title search to verify liens, vesting and legal description and value after closing. Depending on FICO scores and criteria set out in matrix 501, this information may not be required and no post-closing processing will be needed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of processing a secured loan comprising:
accepting a loan application from a borrower, the loan application comprising at least a borrower's identity, collateral identity, and stated income of the borrower;
generating a credit request based upon the borrower's identity to obtain a credit report, the credit report including credit information and credit score information;
accessing a property valuation database using the collateral identity;
based upon the credit report, generating an approval of the property valuation from the database;
based upon the credit report, generating a credit approval;
based upon the credit report, underwriting title of the identified collateral;
wherein the step of underwriting title comprises:
providing a matrix having predefined values relating Fair Issac & Company scores to postponeable title underwriting criteria for the associated Fair Issac & Company score;
determining if the obtained credit history contents meets the postponeable title underwriting criteria specified by the matrix; and
when the credit history contents indicate the postponeable underwriting is satisfied, issuing a conditional underwriting commitment before closing and verifying the title status after closing;
based upon the credit report and the stated income of the borrower and the stated income of the borrower, generating an approval of the borrower's ability to repay the loan;
based upon the credit, collateral, and ability to repay approval, generating loan documentation;
transmitting the loan documentation to the borrower; and closing the loan.

2. The method of claim 1 wherein the secured loan comprises a residential home equity loan.

3. The method of claim 1 wherein the step of generating a credit request comprises generating a request to an online credit reporting agency.

4. The method of claim 1 wherein the step of generating credit approval comprises:
providing a matrix having predefined values relating said Fair Isaac & Company scores to approvable credit history criteria for the associated Fair Isaac & Company score; and
determining if the obtained credit history contents meets the approvable criteria specified by the matrix.

5. The method of claim 1 wherein the step of verifying title status comprises:
performing a deed search in a title record database to obtain a legal description of the collateral and a recorded name of the collateral owner; and
basing the title underwriting on the deed search without a full title record search.

6. The method of claim 5 wherein the step of verifying title status comprises:
obtaining a current status of lien positions from a title database using the collateral property description;
using the deed search results to determine whether title is vested in the borrower; and
using the deed search results to validate a legal description of the collateral property.

7. The method on claim 1 wherein the step of generating an approval of the borrower's ability to repay the loan further comprises:
providing a matrix having predefined values relating said Fair Isaac & Company scores to whether the stated income in the loan application needs to be verified or the associated Fair Isaac & Company score;

determining if the obtained credit history contents meets the Fair Isaac & Company score criteria specified by the matrix; and generating the approval of the borrower's ability to pay without income verification when the obtained Fair Isaac & Company score meets the specified criteria.

8. A secured loan processing system comprising:

a loan processing computer system having an interface for receiving a loan application from a borrower, the loan application comprising at least a borrower's identity, collateral identity, and stated income of the borrower;

a credit reporting database in communication with the loan processing computer for receiving a request based upon the borrower's identity and providing a credit report including a Fair Isaac & Company score to the loan processing computer system;

a property evaluation database in communication with the loan processing computer for receiving a request based upon the collateral identity and providing a database evaluation report to the loan processing computer system;

an underwriting matrix within the loan processing system having an association between credit report values and approval criteria, wherein the loan processing computer can approve the loan application based upon the application contents, the database evaluation, and credit report without reference to additional direct data; and a post closing process implemented by the loan processing computer system for performing a post-closing title verification on the collateral property.

9. The system of claim 8 further comprising:

a document generation module operable within the loan processing computer system for generating signature documentation for approved loans; and a closing agent receiving the generated documentation to close the loan.

10. The system of claim 8 wherein the underwriting matrix includes criteria for issuing a title underwriting policy based entirely on the credit report results.

11. A secured loan processing system comprising:

means for accepting a loan application from a borrower, the loan application comprising at least a borrower's identity, collateral identity, and stated income of the borrower;

means for generating a credit request based upon the borrower's identity to obtain a credit report, the credit report including credit information and credit score information;

means for accessing and property evaluation database using the collateral identity;

means for generating a credit approval based upon the credit report;

means for underwriting title of the identified collateral based upon the credit report;

wherein the means for underwriting title comprises:

means for providing a matrix having predefined values relating Fair Isaac & Company scores to postponeable title underwriting criteria for the associated Fair Isaac & Company score;

means for determining if the obtained credit history contents meets the postponeable title underwriting criteria specified by the matrix; and means for issuing a conditional underwriting commitment before closing based solely upon the credit history and verifying the title status after closing when the credit history contents indicate the postponeable underwriting is satisfied;

means for generating an approval of the borrower's ability to repay the loan based upon the credit report and the stated income of the borrower;

means for generating loan documentation based upon the credit, title, and ability to repay approvals and means for transmitting the loan documentation to the borrower.

12. The system of claim 11 wherein the secured loan comprises a mortgage equity loan.

13. The system of claim 11 wherein the means for generating a credit request comprises means for generating a request to an online credit reporting agency.

14. The system generating credit approval comprises:

means for providing a matrix having predefined values relating Fair Isaac & Company scores to approvable credit history criteria for the associated Fair Isaac & Company score; and means for determining if the obtained credit history contents meets the approvable criteria specified by the matrix.

15. The system of claim 11 wherein the means for verifying title status comprises:

means for performing a deed search in a title record database to obtain a legal description on the collateral and a recorded name of the collateral owner.

16. The system of claim 11 wherein the means for verifying title status comprises:

means for obtaining a current status of lien positions from a title database using the collateral property description;

means for using the deed search results to determine whether title is vested in the borrower; and means for validating a legal description of the collateral property using the deed search result.

17. The system of claim 11 wherein the means for generating an approval of the borrower's ability to repay the loan further comprises:

means for providing a matrix having predefined values relating said Fair Isaac & Company scores to whether the stated income in the loan application needs to be verified for the associated Fair Isaac & Company score;

means for determining if the obtained credit history contents meets the Fair Isaac & Company score criteria specified by the matrix and means for generating the approval of the borrower's ability to pay without income verification when the obtained Fair Isaac & Company score meets the specified criteria.

* * * * *